US012348593B2

(12) United States Patent
Chakravorty et al.

(10) Patent No.: US 12,348,593 B2
(45) Date of Patent: *Jul. 1, 2025

(54) DATA STREAMING SERVICE WITH VIRTUALIZED BROKER CLUSTERS

(71) Applicant: Amazon Technologies, Inc., Seattle, WA (US)

(72) Inventors: Sayantan Chakravorty, Sammamish, WA (US); Nagarjuna Koduru, Snohomish, WA (US); Nabanita Maji, Kenmore, WA (US); Vijaya Rama Reddy Kistampalli, Bothell, WA (US); Sankalp Bhatia, Santa Clara, CA (US); Sahil Dorwat, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,987

(22) Filed: Mar. 19, 2024

(65) Prior Publication Data

US 2024/0223674 A1 Jul. 4, 2024

Related U.S. Application Data

(63) Continuation of application No. 17/810,299, filed on Jun. 30, 2022, now Pat. No. 11,968,279.

(51) Int. Cl.
| | |
|---|---|
| *H04L 67/562* | (2022.01) |
| *H04L 9/40* | (2022.01) |
| *H04L 41/50* | (2022.01) |
| *H04L 65/60* | (2022.01) |

(52) U.S. Cl.
CPC .......... *H04L 67/562* (2022.05); *H04L 41/509* (2013.01); *H04L 63/08* (2013.01); *H04L 65/60* (2013.01)

(58) Field of Classification Search
CPC ..... H04L 67/562; H04L 41/509; H04L 63/08; H04L 65/60
USPC ........................................................ 709/203
See application file for complete search history.

(56) References Cited

U.S. PATENT DOCUMENTS

| | | |
|---|---|---|
| 8,856,374 B2 | 10/2014 | Uhlig et al. |
| 9,946,593 B2 | 4/2018 | Bishop et al. |
| 9,965,330 B2 | 5/2018 | Bishop et al. |
| 9,990,383 B2 | 6/2018 | Brinnand |

(Continued)

OTHER PUBLICATIONS

"Apached Kafka", Retrieved from kafka.apache.org/090/documentation.html#security_sasl, Oct. 28, 2020, pp. 1-213.

(Continued)

*Primary Examiner* — Wing F Chan
*Assistant Examiner* — Leon Y Tseng
(74) *Attorney, Agent, or Firm* — Alexander A. Knapp; Kowert, Hood, Munyon, Rankin & Goetzel, P.C.

(57) ABSTRACT

Various embodiments of systems and methods for providing virtualized (e.g., serverless) broker clusters for a data streaming service are disclosed. A data streaming service uses a front-end proxy layer and a back-end broker layer to provide virtualized broker clusters, for example in a Kafka-based streaming service. Resources included in a virtualized broker cluster are monitored and automatically scaled-up, scaled-down, or re-balanced in a way that is transparent to data producing and/or data consuming clients of the data streaming service.

20 Claims, 13 Drawing Sheets

(56) References Cited

U.S. PATENT DOCUMENTS

| | | |
|---|---|---|
| 10,122,783 B2 | 11/2018 | Qiao et al. |
| 10,146,592 B2 | 12/2018 | Bishop et al. |
| 10,387,426 B2 | 8/2019 | Singh et al. |
| 10,606,711 B2 | 3/2020 | Bishop et al. |
| 10,609,059 B2 | 3/2020 | Apostolopoulos |
| 10,620,924 B2 | 4/2020 | Stojanovic et al. |
| 10,756,991 B2 | 8/2020 | Layman et al. |
| 10,783,044 B2 | 9/2020 | Zhao et al. |
| 10,908,977 B1 | 2/2021 | Ferstay et al. |
| 10,944,807 B2 | 3/2021 | Paduroiu |
| 11,803,448 B1 | 10/2023 | Pani et al. |
| 2018/0068004 A1 | 3/2018 | Lavasani |
| 2019/0102418 A1 | 4/2019 | Vasudevan et al. |
| 2019/0104082 A1 | 4/2019 | Efimov et al. |
| 2019/0163539 A1 | 5/2019 | Bishop et al. |
| 2021/0042280 A1 | 2/2021 | Sharma et al. |
| 2022/0303234 A1 | 9/2022 | Edamadaka et al. |
| 2023/0297592 A1 | 9/2023 | Palukuri et al. |

OTHER PUBLICATIONS

U.S. Appl. No. 17/161,491, filed Jan. 28, 2021, Gokul Ramanan Subramanian et al.
U.S. Appl. No. 17/362,812, filed Jun. 29, 2021, Ayaskant Pani et al.

DATA STREAMING SERVICE WITH VIRTUALIZED BROKER CLUSTERS

PRIORITY APPLICATION

This application is a continuation of U.S. patent application Ser. No. 17/810,299 filed Jun. 30, 2022, which is hereby incorporated by reference herein in its entirety.

BACKGROUND

As the costs of data storage have declined over the years, and as the ability to interconnect various elements of computing infrastructure have improved, more and more data pertaining to a wide variety of applications can be collected and analyzed.

The increase in volumes of streaming data has been accompanied by (and in some cases made possible by) the increasing use of commodity hardware. The advent of virtualization technologies for commodity hardware has provided benefits with respect to managing large-scale computing resources for many types of applications, allowing various computing resources to be efficiently and securely shared by multiple customers. For example, virtualization technologies may allow a single physical computing machine to be shared among multiple users by providing each user with one or more virtual machines (e.g., computing instances) hosted by a single physical computing device, with each such virtual machine being a software simulation acting as a distinct logical computing system while also providing application isolation and security among the various virtual machines.

Despite the availability of virtualized computing and/or storage resources at relatively low cost from various providers, the management and orchestration of the collection, storage, and processing of large dynamically fluctuating streams of data remains a challenging proposition. For example, as more workload is added to a system set up for handling large streams of data, imbalances between different parts of the system may arise. If left unaddressed, such imbalances may lead to severe performance problems at some resources, in addition to underutilization (and hence wastage) of other resources. Also, the addition of resources to address increasing workloads may require re-scaling and/or re-balancing of the data streaming service. However, such re-scaling and/or re-balancing may interrupt the ability of client applications to transmit produced data to be streamed and/or may interrupt the ability of client applications to receive streamed data to be consumed.

Figure 1:
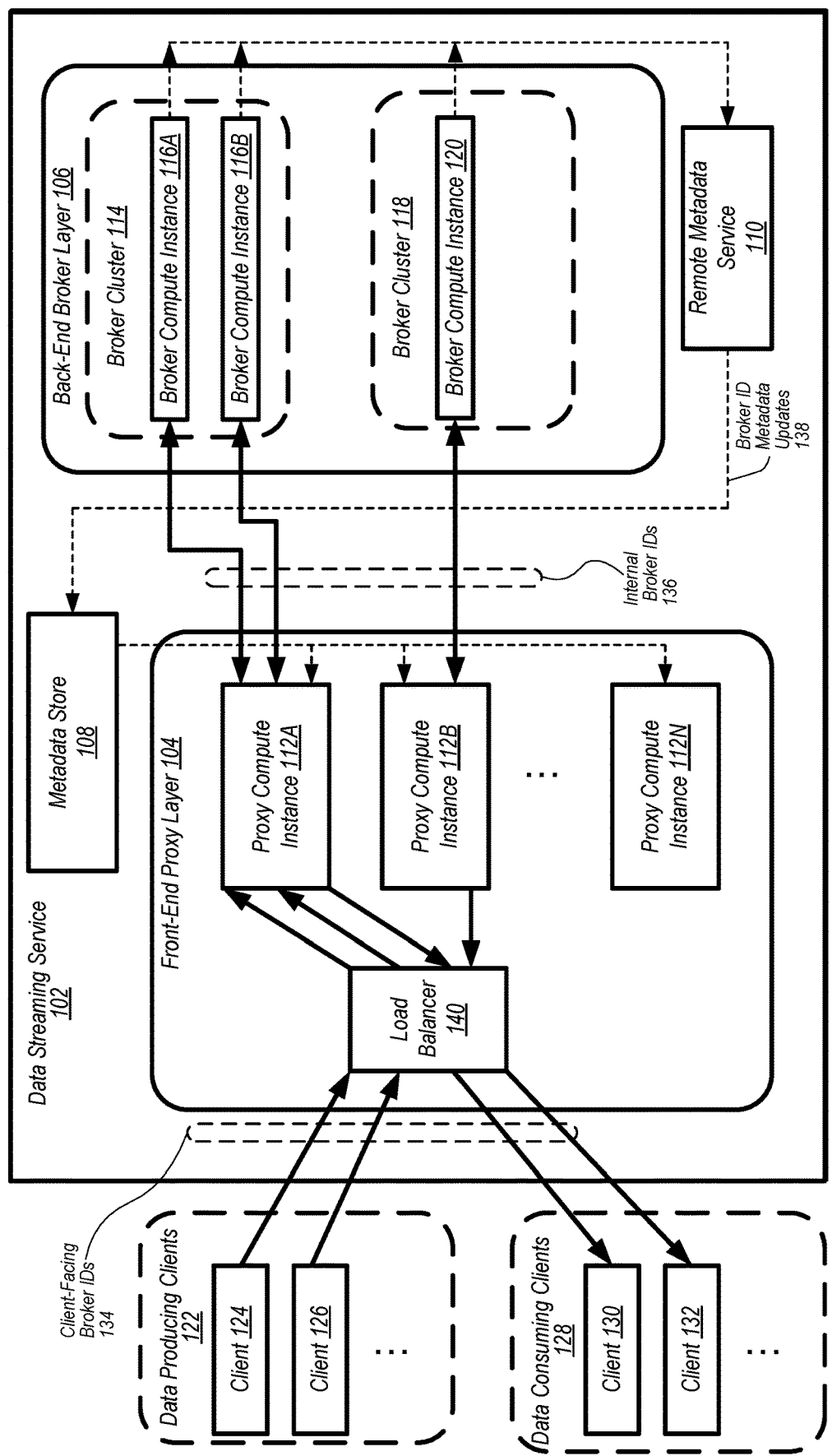
FIG. 1 is a logical block diagram illustrating a data streaming service that includes virtualized broker clusters implemented using front-end proxy computing instances and back-end broker computing instances, according to some embodiments.

While embodiments are described herein by way of example for several embodiments and illustrative drawings, those skilled in the art will recognize that the embodiments are not limited to the embodiments or drawings described. It should be understood, that the drawings and detailed description thereof are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments described herein relate to a data streaming service implemented using virtualized broker clusters. In some embodiments, a data streaming service includes a front-end proxy layer and a back-end broker layer. The front-end proxy layer includes proxy compute instances configured to provide a client-facing broker ID to a data producing client and/or a data consuming client of the data streaming service connected to a virtualized broker cluster. A metadata service and metadata store maintains a one-to-one mapping between provided client facing broker IDs and internal broker IDs for broker computing instances implemented in the back-end broker layer for the virtualized broker cluster, and the metadata store provides these mappings to the proxy computing instance. Because the internal broker IDs are abstracted away from the data producing clients and the data consuming clients, and because the data producing clients and the data consuming clients are only provided the client-facing broker IDs, a virtualized broker cluster can be scaled up, scaled down, or re-balanced without causing the data producing clients and the data consuming clients to re-connect to a new broker cluster. For example, a data producing client or a data consuming client may have a connection to a virtualized broker cluster addressed using a client-facing broker ID that is implemented as an endpoint on a proxy computing instance. During a re-scaling or re-balancing of the virtualized broker cluster, the data producing client or the data consuming client may continue to be connected to the proxy computing instance at the endpoint corresponding to the client-facing broker ID. However, in a manner transparent to the data producing or data consuming clients, the metadata store and proxy compute instance may update the one-to-one mapping for the given client-facing broker ID, such that the client-facing broker ID is now (after the re-scaling) mapped to a different broker computing instance (having a different internal broker ID). Also, in some embodiments, partitions of topics hosted by different back-end broker computing instances may be re-balanced. However, in a similar manner, a topic partition mapping at a proxy computing instance may be updated such that topic partition IDs remain mapped to the same client-facing broker IDs, but the client facing broker IDs are now mapped to different back-end broker computing instances of the virtualized broker cluster, having different internal broker IDs.

In some embodiments, the back-end layer may comprise a remote metadata service connection and the front-end layer may comprise a metadata store configured to record, as journal entries, changes to the back-end broker configurations, such as the addition of more broker computing instances, changes in identity of the broker computing instances (e.g., swapping out a lesser capacity broker computing instance for a broker computing instance with more processing or storage capacity, as an example), changes in topic partition assignments across the broker computing instances (e.g. due to a re-balancing), etc. The changes may be logged in the journal of the metadata store by way of metadata delivered to the metadata store from the remote metadata service. This metadata may be used by the proxy computing instances of the front-end layer to continuously or periodically update the mappings maintained at the proxy computing instances, wherein the mappings comprise one-to-one mappings between client-facing broker IDs and internal broker IDs of the broker computing instances of the back-end layer.

In some embodiments, the proxy computing instances may be multi-tenant, meaning that a given proxy computing instance may provide multiple endpoints addressable via multiple client-facing broker IDs and may maintain multiple respective instances of one-to-one mapping information between the client-facing broker IDs and the internal broker IDs of the broker computing instances of the back-end layer. In some embodiments, a given proxy computing instance may be used for implementing multiple virtualized broker clusters (e.g., the proxy computing instance may maintain mappings between client-facing broker IDs and internal broker IDs for multiple virtualized broker clusters). In some embodiments, proxy computing instances used to host virtualized broker clusters may be scaled up or scaled down, for example, based on message throughput. In some embodiments, a load balancer may be situated between data producing clients and data consuming clients, and the proxy computing instances. The load balancer may balance message flow between the respective proxy computing instances.

In some embodiments, each of the proxy computing instances of the front-end layer may maintain a full set of one-to-one mappings between client-facing broker IDs and internal broker IDs for virtualized broker clusters hosted by a portion of the data streaming service. Thus, a load balancer may balance incoming requests from data producing clients or data consuming clients amongst any of the proxy computing instances. In turn, a selected proxy computing instance may use metadata stored at the proxy computing instance (or received from the metadata store) to map the data producing client or data consuming client request to the appropriate back-end broker computing instance having an internal ID mapped to a client-facing broker ID indicated in the request from the data producing client or the data consuming client.

In some embodiments, topics serviced by a same proxy computing instance for different virtualized broker clusters may be disambiguated by appending a prefix to the topics to distinguish between them.

In some embodiments, placement of broker computing instances may be performed based on broker sets, wherein broker computing instances for a given management client are placed on a set of virtualization hosts implementing the broker computing instances. The set may be selected such that the broker computing instances for a given client are hosted by only a subset of a full set of back-end broker compute instances that are available. In this way a blast radius of a given client may be contained. For example, if the given client has excessive workload, such as situation will only affect a subset of the broker compute instances and not the full set.

In some embodiments, the data streaming service may conform to a Kafka protocol for streaming data between data producing clients and data consuming clients. In some embodiments, the data streaming service may provide real-time (or near real-time) streaming of events (e.g., messages or tasks). For example, the data streaming service may allow clients to publish (e.g., write) and subscribe to (e.g., read) streams of events including continuous import/export of data from other systems outside of the data streaming service. The data streaming service may also enable clients to store streams of events durably and reliably in the data streaming service (e.g., the broker computing instances) and process streams of events as they occur or retrospectively.

A data ingestion system, such as source connectors in Kafka and/or Kafka Connect, may provide data from a source to a distributed data store made up of broker computing instances. The data ingestion system may read data from one location, and write the data into a distributed data store. The data ingestion system can read from, for example, a file, a file system, a database, a data stream, an IoT device service, a log data service, a log storage service, which are just some of many examples where data can be read from.

In Kafka, for example, a source connector can be a process that manages the various tasks that actually perform the data movement for that connector from sources to the output topic. There can be any number of tasks for a particular connector, in some embodiments. The source connector acts as a manager for the tasks. It can expose a management API for modification, task reconfiguration, etc. The tasks are hosted on task nodes, that can be hosting one or more tasks.

In some embodiments, the data source might be a client or a customer of the data ingestion system and/or the streaming service. In these embodiments, the clients or customers might be added or deleted on a regular basis, and/or the data traffic from individual clients or customers might be increasing or decreasing constantly. Therefore, it is very difficult if not impossible to know at one point in time the load from the clients or customers at a future point in time. Therefore, a task manager can obtain data, such as reporting or feedback from the tasks and/or the task nodes, and reconfigure the clients or customers among the task and/or task nodes, such as by using a load balancing algorithm, in some embodiments.

In some embodiments, provisioning of resources for a virtualized broker cluster may be performed automatically on behalf of an administrative client (e.g., management client that requests establishment of the virtualized broker cluster). For example, a data streaming service providing virtualized broker clusters may manage the provisioning of proxy computing instances and back-end broker computing instances for the administrative client. Furthermore, the data streaming service may automatically scale up or down the provisioned resources as well as re-balance topics between the provisioned resources on behalf to an administrative client without the administrative client having to monitor workloads or manage the scaling or re-balancing workflows.

In some embodiments, a virtualized broker cluster allows un-limited data retention This is because the data streaming service may automatically scale up broker computing instances (and their associated storage) as necessary to meet data storage requirements. Thus, retained data is not required to be dropped, but instead can be stored and storage scaled appropriately to enable storage of all retained data.

In some embodiments, a data streaming service may provide private connectivity (e.g., virtual private networks, direct connect network connections, etc.) between client endpoints and proxy computing instance endpoints (e.g., corresponding to client-facing broker IDs). Also, client data may be encrypted in transit and at rest.

In some embodiments, computing capacity of the broker computing instances may be monitored and in response to computing capacity utilization exceeding a threshold amount (for example due to a volume of transactions being processed), the actual broker clusters in the back-end may be scaled up to include broker computing instances with more computing capacity and/or a larger quantity of broker computing instances. In a similar manner, the actual broker clusters in the back-end may be scaled down in response to computing capacity utilization falling below another threshold.

In some embodiments, a single back-end actual broker cluster comprising a set of broker computing instances may be used to host multiple virtualized broker clusters, wherein a proxy computing instance disambiguates between the virtualized broker clusters by appending a prefix or suffix to topics that overlap between the two virtualized broker clusters. Also, the proxy computing instance and/or the metadata service and metadata store perform mapping, such that to data producing clients and data consuming clients interacting with different respective client-facing broker IDs for the "brokers" of the two virtualized broker clusters, the virtualized broker clusters are presented as distinct and separate broker clusters (even though they are actually implemented using the same back-end broker cluster resources).

In some embodiments, a data streaming service provides various application programmatic interfaces (APIs) for use in relation to virtualized broker clusters, such as a create virtualized broker cluster API, delete virtualized broker cluster API, describe virtualized broker cluster API, etc.

In some embodiments, a control plane of the data streaming service carries out the requests received via the API (such as creating or deleting a virtualized broker cluster). Also, in some embodiments, an API status call, such as describe virtualized broker cluster, may be routed to an underlying service that provides the resources of the virtualized broker cluster. For example, where the broker computing instances are implemented using computing instances of a virtualized computing service of a provider network also hosting the data streaming service, the describe virtualized broker cluster API may route a request to the virtualized computing service to return a description of the virtual computing instances of the virtualized computing service being used to implement the broker computing instances of the virtualized broker cluster.

FIG. 1 is a logical block diagram illustrating a data streaming service that includes virtualized broker clusters implemented using front-end proxy computing instances and back-end broker computing instances, according to some embodiments.

In some embodiments, a data streaming service 102 includes a front-end proxy layer 104 and a back-end broker layer 106. The data streaming service 102 also includes a remote metadata service 110, and a metadata store 108. Proxy computing instances, such as proxy computing instances 112A through 112N, serve as proxies for the back-end broker clusters 114 and 118. Note that back-end broker clusters 114 and 118 are actual broker clusters which comprise broker compute instances 116A-116B and broker compute instance 120, respectively. The broker compute instances of the broker clusters 114 and 118 may be grouped in various combinations into virtualized broker clusters, wherein a client-facing broker ID is provided by a proxy computing instance to a client and wherein the proxy computing instance stores a mapping of the client-facing broker ID to internal broker IDs of the broker computing instances of the actual broker clusters 114 and 118.

For example, proxy compute instance 112A may provide two different client-facing broker IDs to data producing clients 122 or data consuming clients 128, where the different client-facing broker IDs are for brokers of different virtualized broker clusters, but wherein the different virtualized broker clusters are implemented using shared resources of actual broker cluster 114. Continuing the example, a first virtualized broker cluster may include a first client-facing broker ID 134 provided to client 124 that maps to broker computing instance 116A, and a second virtualized broker cluster may include another client-facing broker ID 134 provided to client 126. Proxy computing instance 112A may maintain a mapping for both the first and second client-facing broker IDs to the same actual broker compute instance 116A. Also, if throughput expands from clients 124 and 126, the proxy compute instance 112A may update (or receive an update to) the mapping to map the first and second client-facing broker IDs to different actual broker computing instances. For example, the client facing broker ID provided to client 126 may be re-mapped to broker compute instance 116B in order to free up capacity of broker compute instance 116A.

While not shown in FIG. 1 (but discussed in more detail in FIGS. 2 and 4-5) not only may mapping be updated to re-balance load between existing broker compute instances, additional broker compute instances may be added, also additional actual broker clusters may be added. In response to the addition of resources, the remote metadata service 110 may cause updated metadata to be written to metadata store 108. Also, the proxy compute instances, such as proxy compute instances 112A through 112N, may update (or receive updates to) their mappings to include the added resources. In some embodiments, a control plane or resource manager may monitor workloads of the respective broker computing instances and/or proxies, and the control plane or resource manager may coordinate scaling up, or scaling down, broker resources and/or proxy resources. Also, the remote metadata service 110 and metadata store 108 may further coordinate the re-mapping of client-facing broker IDs to reflect the added resources. Also, the control plane or resource manager may coordinate a re-balancing of partitions of topics between broker computing instances, wherein the remote metadata service 110 and the metadata store 108 coordinate the necessary mapping changes resulting from the re-balancing.

In some embodiments, front-end proxy layer 104 includes a load balancer 140. In some embodiments, load balancer 140 may provide data producing clients 122 and data consuming clients 128 a common endpoint to contact for request to produce or fetch items. The requests may be distributed by the load balancer to any one of the proxy compute instances 112A through 112N. A selected proxy computing instance, such as proxy computing instance 112A, may translate the client-facing broker ID included with the request to an internal broker ID stored in a one-to-one mapping, and may further route the request to the appropriate back-end broker compute instance, based on an internal broker ID indicated in the one-to-one mapping as corresponding to the client-facing broker ID provided with the request.

In some embodiments, front-end proxy layer 104 may enforce throttling limits for incoming requests from the one or more data producing clients and/or the one or more data consuming clients directed at a given one or more internal broker IDs of the one or more broker computing instances assigned to a given virtual broker cluster.

Figure 2:
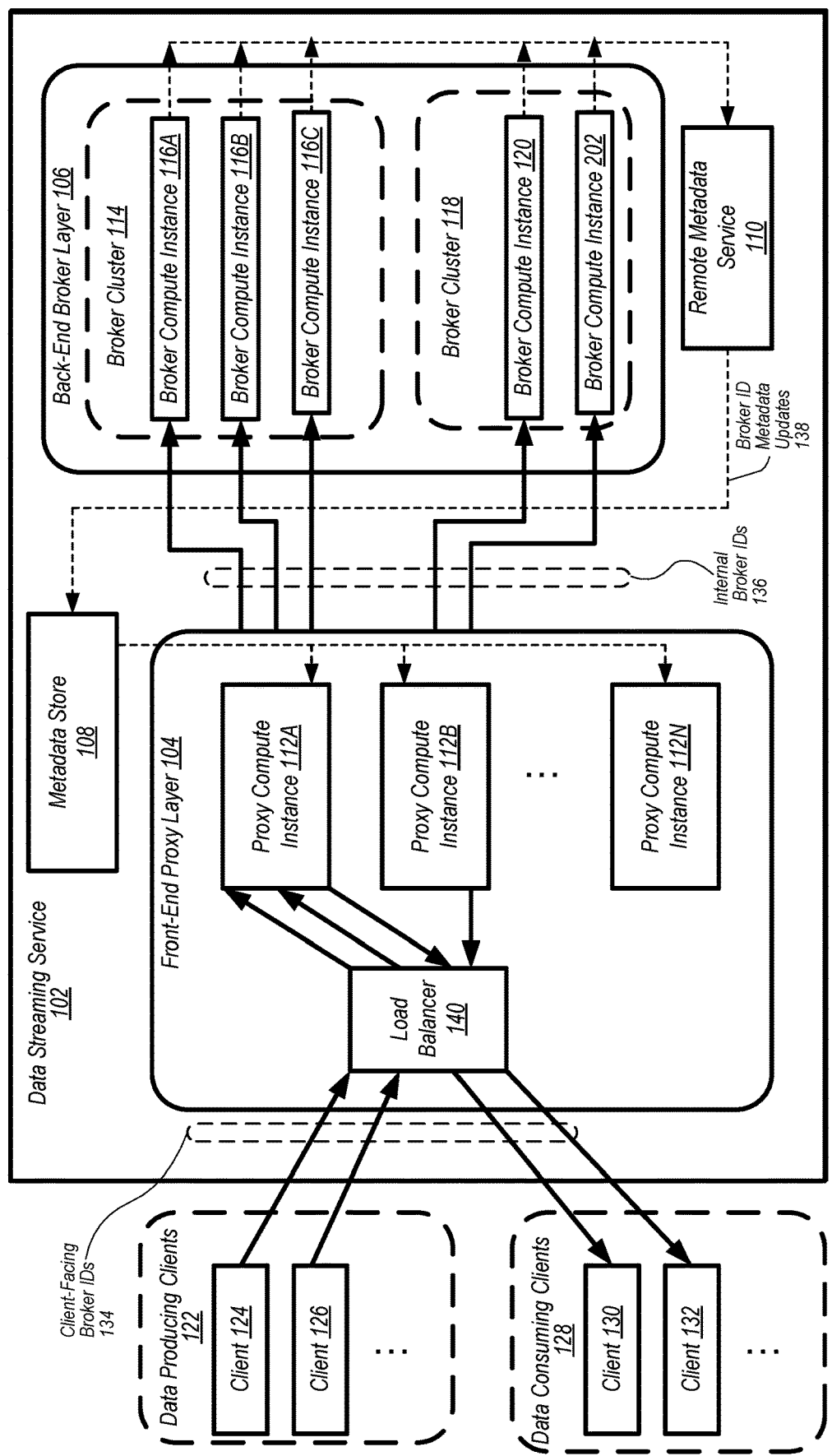
FIG. 2 is a logical block diagram illustrating the data streaming service, wherein the broker clusters have been scaled up in a way that is transparent to data producing clients and/or data consuming clients, according to some embodiments.

For example, FIG. 2 is a logical block diagram illustrating the data streaming service, wherein a given one of the broker clusters have been scaled up in a way that is transparent to data producing clients and/or data consuming clients, according to some embodiments.

In FIG. 2, broker compute instance 116C has been added to broker cluster 114. In response, remote metadata service 110 provides broker ID metadata updates 136 to metadata store 108. Also, the proxy compute instances 112A through 112N update mappings (or receive updated mappings) between the first and second client-facing broker IDs 134 provided to clients 124 and 126 and the back-end broker computing instances. As an example, the client-facing broker ID provided to client 124 may be re-mapped to both broker compute instance 116A and 116B and the client-facing broker ID provided to client 126 may be re-mapped to the added broker compute instance 116C.

As another example, in FIG. 2, broker compute instance 202 has been added to broker cluster 118 and the mapping of the client-facing broker ID provided to client 132 has been updated to be mapped to both broker compute instance 120 and 202.

Figure 3:
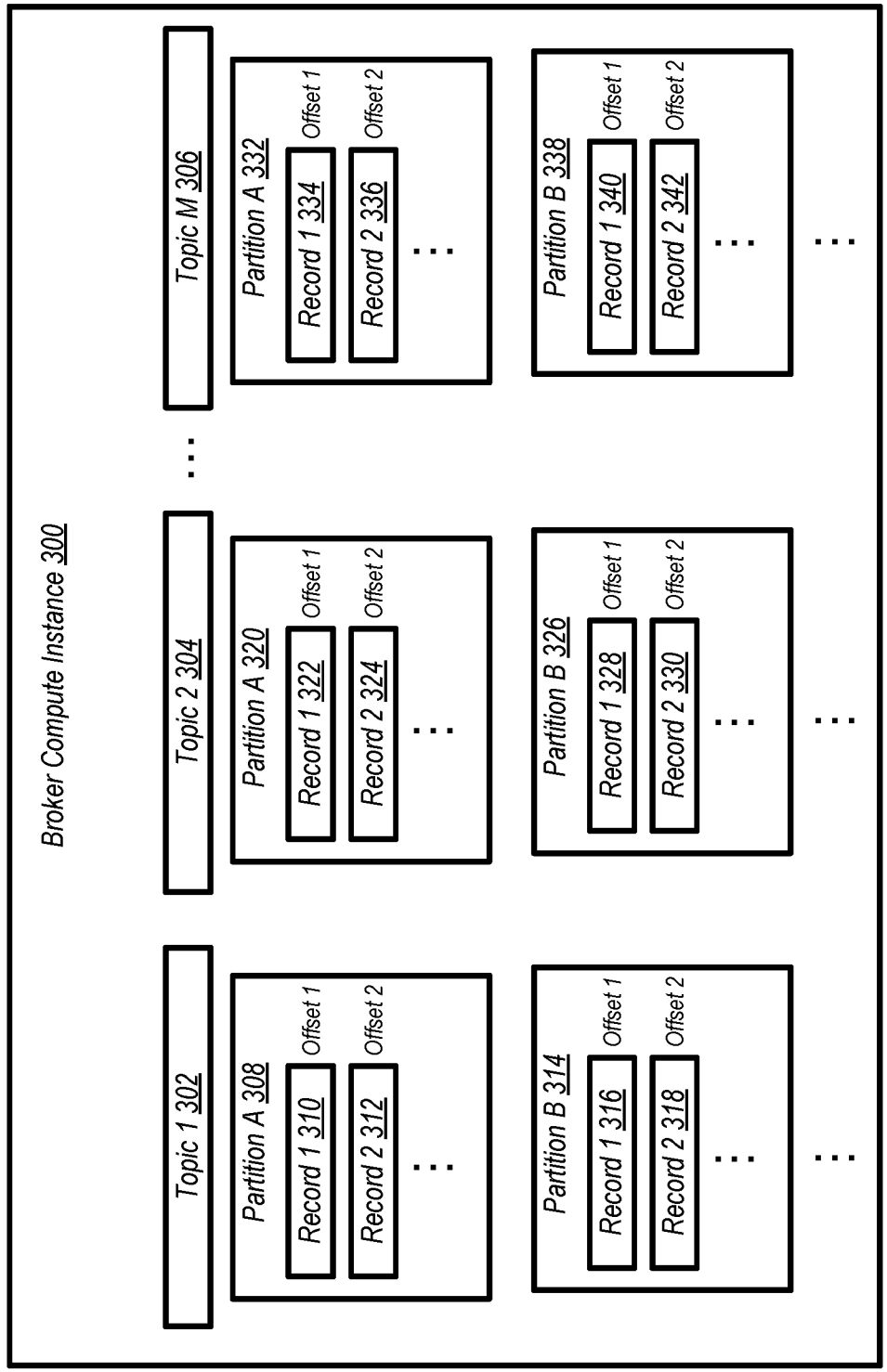
FIG. 3 is a logical block diagram illustrating an example broker computing instance hosting a plurality of topics, wherein each topic has associated partitions, according to some embodiments.

FIG. 3 is a logical block diagram illustrating an example broker computing instance hosting a plurality of topics, wherein each topic has associated partitions, according to some embodiments.

As mentioned above, each given broker compute instance, such as those shown in FIGS. 1-2, may store data records for multiple topics. Also, each topic may include multiple partitions, and each partition may include multiple records stored at different offsets within the partition. For example, broker compute instance 300 includes topics 1 through 3 (e.g., topics 302, 304, and 306). Also, topic 302 includes partitions 308 and 314, wherein partition 308 includes records 310 and 312, and partition 314 includes records 316 and 318. In a similar manner topic 304 includes partitions 320 and 326, wherein partition 320 includes records 322 and 324, and partition 326 includes records 328 and 330. As yet another example, topic 306 includes partitions 332 and 338, wherein partition 332 includes records 334 and 336 and partition 338 includes records 340 and 342. In some embodiments, a topic may be a logic construct, wherein partitions represent actual storage space on a given broker compute instance or storage resource attached to a given broker compute instance.

Note that FIG. 3 is given as an example. In some embodiments, a broker computing instance may host any number of topics. Also, a given topic may include any number of partitions and respective partitions may include various numbers of records.

Figure 4:
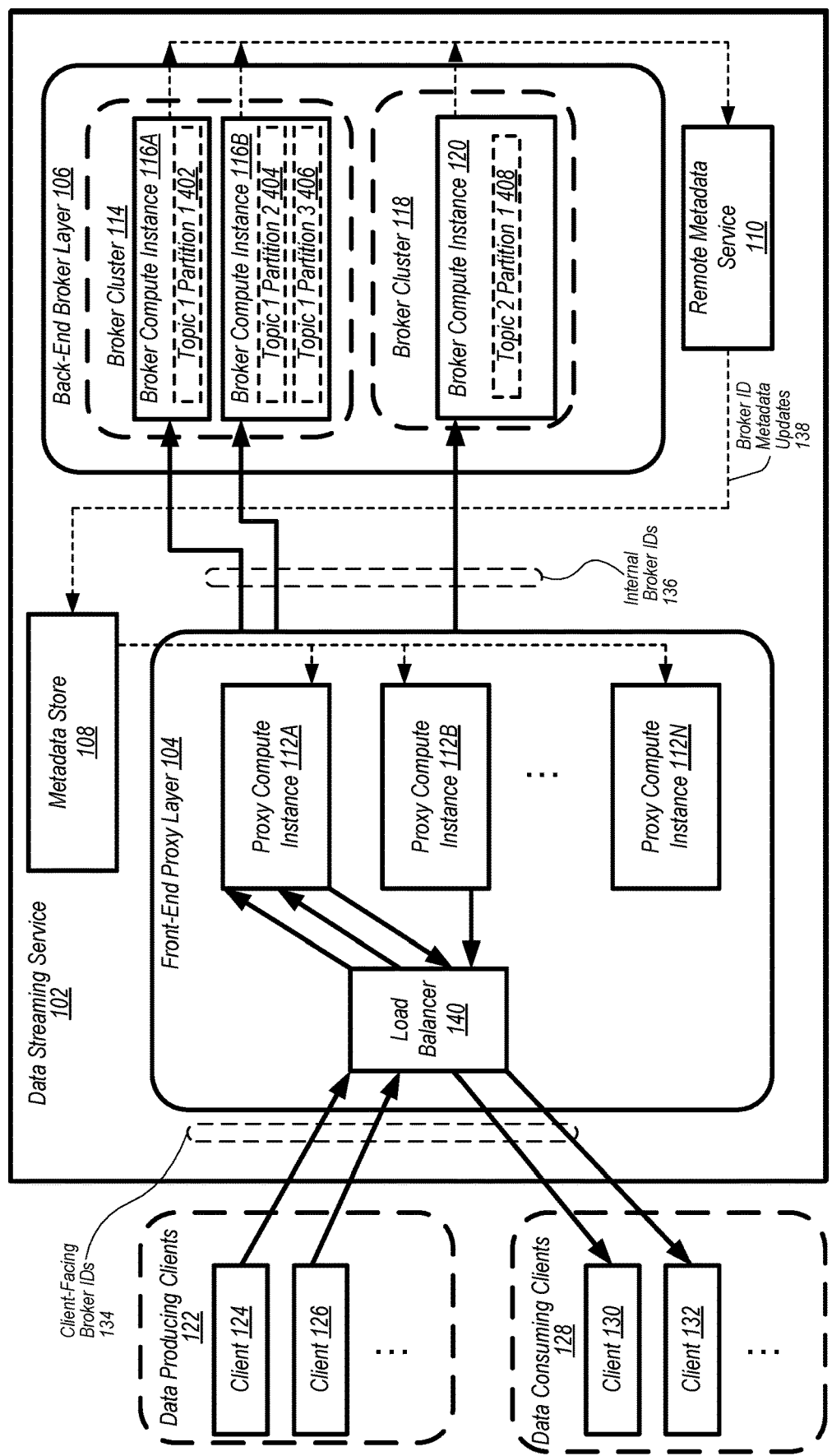
FIG. 4 is a logical block diagram illustrating partitions of topics hosted by different ones of the broker computing instances of the data streaming service, according to some embodiments.

FIG. 4 is a logical block diagram illustrating partitions of topics hosted by different ones of the broker computing instances of the data streaming service, according to some embodiments.

As another example, FIG. 4 illustrates broker compute instance 116 hosting topic 1 partition 1 (402), broker compute instance 116B hosting topic 1 partitions 2 and 3 (404 and 406), and broker compute instance 120 hosting topic 2 partition 1 (408). In some embodiments, the topics, hosted on a given broker compute instance may be topics of different virtualized broker clusters mapped to different client-facing broker IDs. For example, proxy compute instance 112A may maintain topic level mappings between topics 1 and 2 and a client-facing broker ID. In some situations, it may be advantageous to re-balance the topic partitions between broker compute instances. For example, topic 1 partition 2 (404) may have a high volume of writes and/or reads associated with it. Thus, instead of broker compute instance 116B hosting both topic 1 partition 2 (404) and topic 1 partition 3 (406), it may improve performance to re-balance topic 1 partition 2 (404) to be hosted by broker compute instance 116A. For example, this is shown in FIG. 5.

Figure 5:
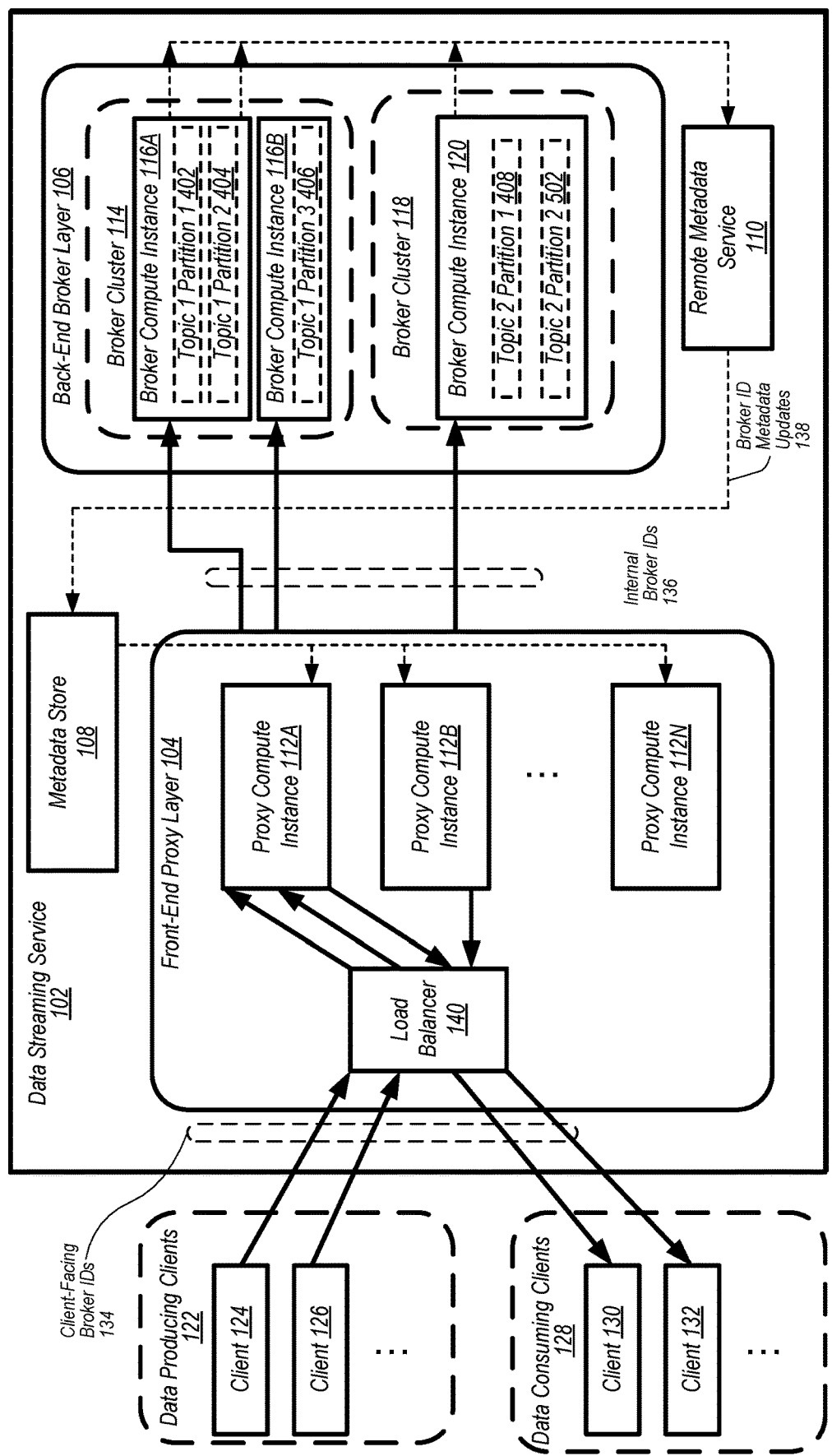
FIG. 5 is a logical block diagram illustrating the data streaming service subsequent to a re-balancing of the partitions of the topics between the broker computing instances, wherein the re-balancing is transparent to data producing clients and/or data consuming clients of the data streaming service, according to some embodiments.

FIG. 5 is a logical block diagram illustrating the data streaming service subsequent to a re-balancing of the topic partitions between the broker computing instances, wherein the re-balancing is transparent to data producing clients and/or data consuming clients of the data streaming service, according to some embodiments.

Continuing the example from above, the re-balancing of topic 1 partition 2 (404) may be indicated in metadata provided to remote metadata service 110. This metadata may then be written as a journal entry in metadata store 108 and provided to proxy computing instance 112A to update a mapping to indicate that topic 1 partition 2 (404) is now to be mapped to broker compute instance 116A (instead of broker compute instance 116B).

Figure 6:
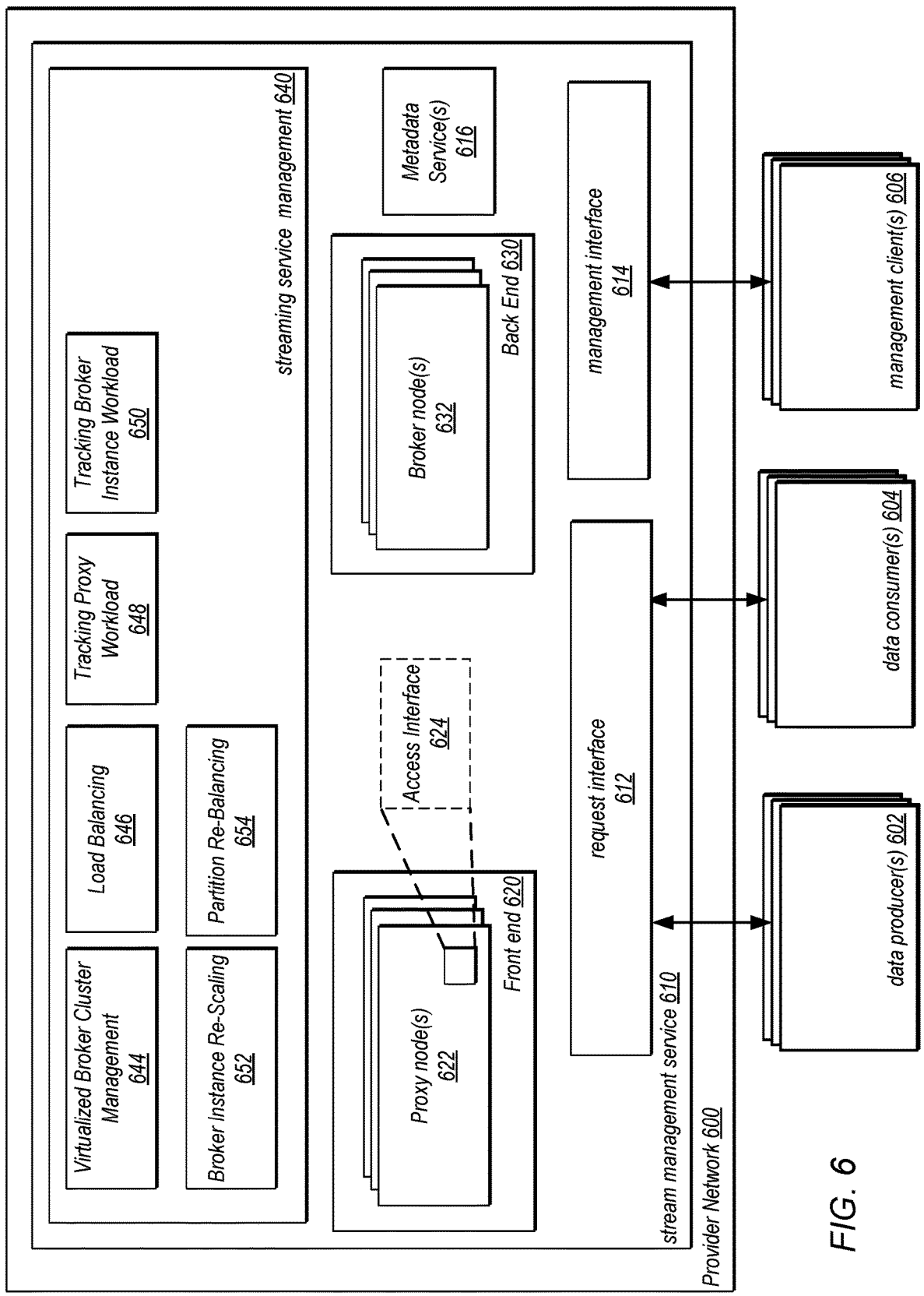
FIG. 6 is a logical block diagram of a streaming data service of a provider network that interfaces with management clients for configuration of virtualized broker clusters, and interfaces with data producers and/or data consumers for its operation, according to some embodiments.

FIG. 6 is a logical block diagram of a stream management service 610 of a provider network 600. The stream management service ("SMS") interfaces to management client(s) 606 for configuration through a management interface 614, and data producer(s) 602 and data consumer(s) 604 for its operation through a request interface 612. The stream management service 610 comprises front-end 620 that includes proxy nodes 622, back-end 630 that includes broker nodes 632, and metadata service(s) 616, which may include a remote metadata service and metadata store, such as remote metadata service 110 and metadata store 108 illustrated in FIG. 1. The stream management service 610 also comprises a streaming data service management system 640 that comprises a virtualized broker cluster management module 644, a load balancing module 646, a module for tracking proxy workload 648, a module for tracking broker compute instance workload 650, a broker compute instance re-scaling module 652, and a topic re-balancing module 654, according to some embodiments.

Stream management service 610 may ingest data from one or multiple sources 602 for a data stream, store the data in the back-end 632 via the broker nodes 632 and provide access to the data for service-provider consumers or processors of the data, or consumers or processors of the data externally located (with respect to the provider network 600).

In order to coordinate the operation of various subsystems within stream management service 610, streaming data service management 640 may implement various management functions.

In some embodiments, proxy nodes 622 include an access interface 624. The access interface may verify the identity of a requesting data producer 602 and data consumer 604. The access interface may further pass access credentials for the data produce 602 or data consumer 604 to the broker nodes 632, such that the access interface of the proxy nodes coordinates both connection request approval and (in consultation with the back-end broker nodes) request approval. In this way a data producing client or a data consuming client does not have to separately negotiate request approval with the back-end broker nodes. This may be done on its behalf by the access interface 624 of the proxy nodes 622.

Figure 7:
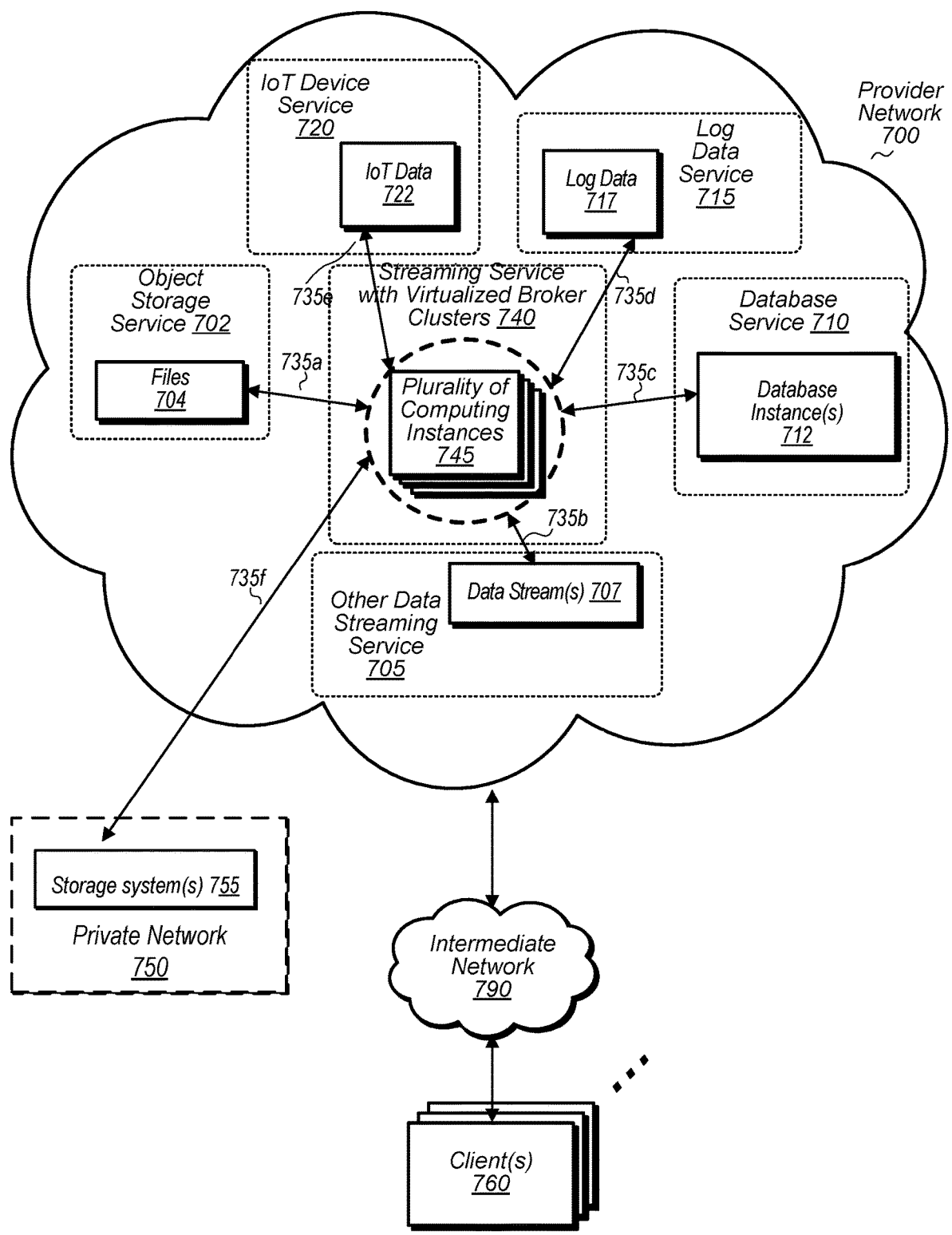
FIG. 7 illustrates an example provider network environment for a data streaming service that offers virtualized broker clusters implemented by a plurality of server instances, and where the data streaming service is configured to interface with an IoT device service, a log data service, an object storage service, a database service, an additional data stream service, and/or an external private network, and where clients communicate with the provider network through an intermediate network, according to some embodiments.

FIG. 7 illustrates an example provider network 700 environment for the implementation of virtualized cluster brokers, wherein the proxy compute instances and the broker compute instances are implemented by a plurality of computing instances 745. The streaming service nodes 740 communicate with an IoT device service 722, a log data service 715, an object storage service 702, a database service 710, a data stream service 705, and/or an external private network 750, according to some embodiments. The clients 760 communicate with the provider network 700 through an intermediate network 790, according to some embodiments.

A service provider network 700 may provide computing resources via one or more computing services or event-driven computing services to the client(s) 760. The service provider network 700 may be operated by an entity to provide one or more services, such as various types of cloud-based computing or storage services, accessible via the Internet and/or other networks 790 to client(s) 760. In some embodiments, the service provider network 700 may implement a web server, for example hosting an e-commerce website. Service provider network 700 may include numerous data centers hosting various resource pools, such as collections of physical and/or virtualized computer servers, storage devices, networking equipment and the like, needed to implement and distribute the infrastructure and services offered by the service provider network 700. In some embodiments, service provider network may employ computing resources for its provided services. These computing resources may in some embodiments be offered to client(s) 760 in units called "instances," such as virtual compute instances.

A provider network 700 may provide resource virtualization to clients via one or more virtualization services that allow clients to access, purchase, rent, or otherwise obtain instances of virtualized resources, including but not limited to computation and storage resources, implemented on devices within the provider network or networks in one or more data centers. In some embodiments, private IP addresses may be associated with the resource instances; the private IP addresses are the internal network addresses of the resource instances on the provider network 700. In some embodiments, the provider network 700 may also provide public IP addresses and/or public IP address ranges (e.g., Internet Protocol version 4 (IPv4) or Internet Protocol version 6 (IPv6) addresses) that clients may obtain from the provider 700.

Conventionally, the provider network 700, via the virtualization services, may allow a client of the service provider (e.g., a client that operates clients 760) to dynamically associate at least some public IP addresses assigned or allocated to the client with particular resource instances assigned to the client. The provider network 700 may also allow the client to remap a public IP address, previously mapped to one virtualized computing resource instance allocated to the client, to another virtualized computing resource instance that is also allocated to the client. Using the virtualized computing resource instances and public IP addresses provided by the service provider, a client of the service provider such as the operator of clients 760 may, for example, implement client-specific applications and present the client's applications on an intermediate network 790, such as the Internet. Either the clients 760 or other network entities on the intermediate network 790 may then generate traffic to a destination domain name published by the clients 760. First, either the clients 760 or the other network entities can make a request through a load balancer for a connection to a compute instance in the plurality of compute instances.

A load balancer can respond with the identifying information which might include a public IP address of itself. Then the clients 760 or other network entities on the intermediate network 790 may then generate traffic to public IP address that was received by the router service. The traffic is routed to the service provider data center, and at the data center is routed, via a network substrate, to the private IP address of the network connection manager currently mapped to the destination public IP address. Similarly, response traffic from the network connection manager may be routed via the network substrate back onto the intermediate network 740 to the source entity.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance. Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all resource instance types.

At least some public IP addresses may be allocated to or obtained by clients of the provider network 700; a client may then assign their allocated public IP addresses to particular resource instances allocated to the client. These public IP addresses may be referred to as client public IP addresses, or simply client IP addresses. Instead of being assigned by the provider network 700 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. A client IP address can be an Elastic IP address. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

A provider network 700 may provide a compute service, or an event-driven compute service, implemented by physical server nodes to clients 760, which includes a plurality of compute instances. The compute service also contains many other server instances for many other clients and other customers of the provider network 700. As another example, the provider network provides a virtualized data storage service or object storage service 702 which can include a plurality of data storage instances implemented by physical data storage nodes. The data storage service or object storage service 702 can store files 704 for the client, which are accessed through a file access 735*a* by the appropriate server instance of the client. As another example, the provider network might provide a virtualized database service 710 implemented by database instances 712, which includes at least one database instance for a client. A server instance pertaining to the client in the compute service can access a database instance pertaining to the client when needed through a database access 735*c*. The database service can contain a database instance that includes a database of sources of data. The database service and data storage service also contain multiple files or database instances that pertain to other clients and other customers of the provider network 700. The provider network can also include multiple other client services that pertain to one or more customers. For example, the provider network 700 can include a data stream service 705 to customers. This data stream service 705 can include data stream(s) 707 that delivers a stream of data to the task nodes 740. The clients 760 may access any one of the client services 702, 720, 715, 710, or 705 for example, via an interface, such as one or more APIs to the service, to obtain usage of resources (e.g., data storage instances, or files, or database instances, or server instances) implemented on multiple nodes for the service in a production network portion of the provider network 700.

Figure 8:
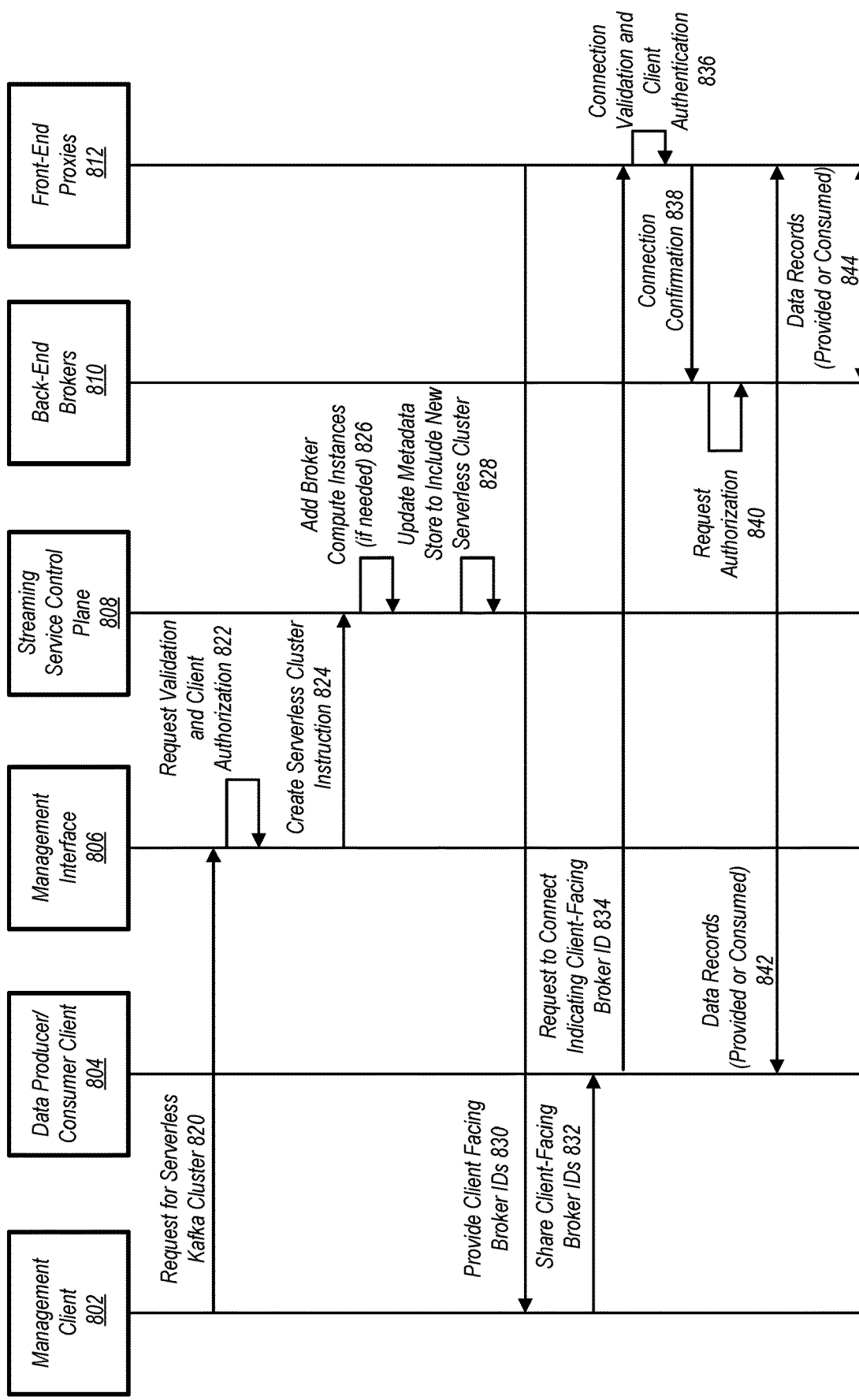
FIG. 8 is a diagram illustrating interactions between clients and components of a data streaming service in order to establish and utilize a virtualized broker cluster, according to some embodiments.

FIG. 8 is a diagram illustrating interactions between clients and components of a data streaming service in order to establish and utilize a virtualized broker cluster, according to some embodiments.

At step 820, a management client 802 sends a request for a serverless Kafka cluster (e.g., virtualizes broker cluster) to management interface 806 (e.g., an administrative streaming service API), which may be included in a management interface, such as management interface 614 shown in FIG. 6. The management interface 806, at step 822, validates the request and determines client 802 is authorized to request a serverless Kafka cluster. Then, at step 824, the management interface 806 forwards the request to streaming service control plane 808. At step 826, the streaming service control plane 808 initiates a workflow with back-end brokers 810 to provide broker compute instances, if needed, for the requested serverless Kafka cluster. Note that existing broker computing instance may be used, but if capacity is limited additional broker compute instance may also be added. Also, at step 828, the streaming service control plane 808 updates the metadata store to indicate one or more client-facing broker IDs for the serverless Kafka cluster and also to indicate mappings of these client-facing broker IDs to internal broker IDs of broker compute instances of the back-end 810. Note that the Kafka cluster is described as serverless because it is implemented using a virtualized cluster broker without a dedicated server (or necessarily dedicated broker compute instances, e.g., the broker compute instances may be shared). At step 830, the font end proxy provides client-facing broker IDs to the management client 802. At step 832, the management client shares the client-facing broker IDs with data producing and/or data consuming clients 804.

At step 834, the data producing and/or data consuming clients 804 issue a request to connect that indicates the provided client-facing broker ID. The request is sent to front end proxies 812. At step 836, the front-end proxies 812 validate the request and determine whether the data producing and/or data consuming clients are authenticated and authorized to connect to a virtualized broker cluster comprising the indicated client-facing broker ID. At step 838, the front-end proxies 812 issue a connection confirmation to the back-end brokers 810, which then, at 840, authorize (or refuse) the request.

At step 842 the data producing and/or data consuming clients produce (or fetch) data records by sending the data records (or requests for data records) to the front-end proxies 812. Also, at step 844, the front-end proxies 812 forward the requests for data records to be fetched or data records to be written to the appropriate back-end brokers 810 based on respective one-to-one mappings between client-facing broker IDs and internal broker IDs maintained by the front-end proxies 812.

Figure 9:
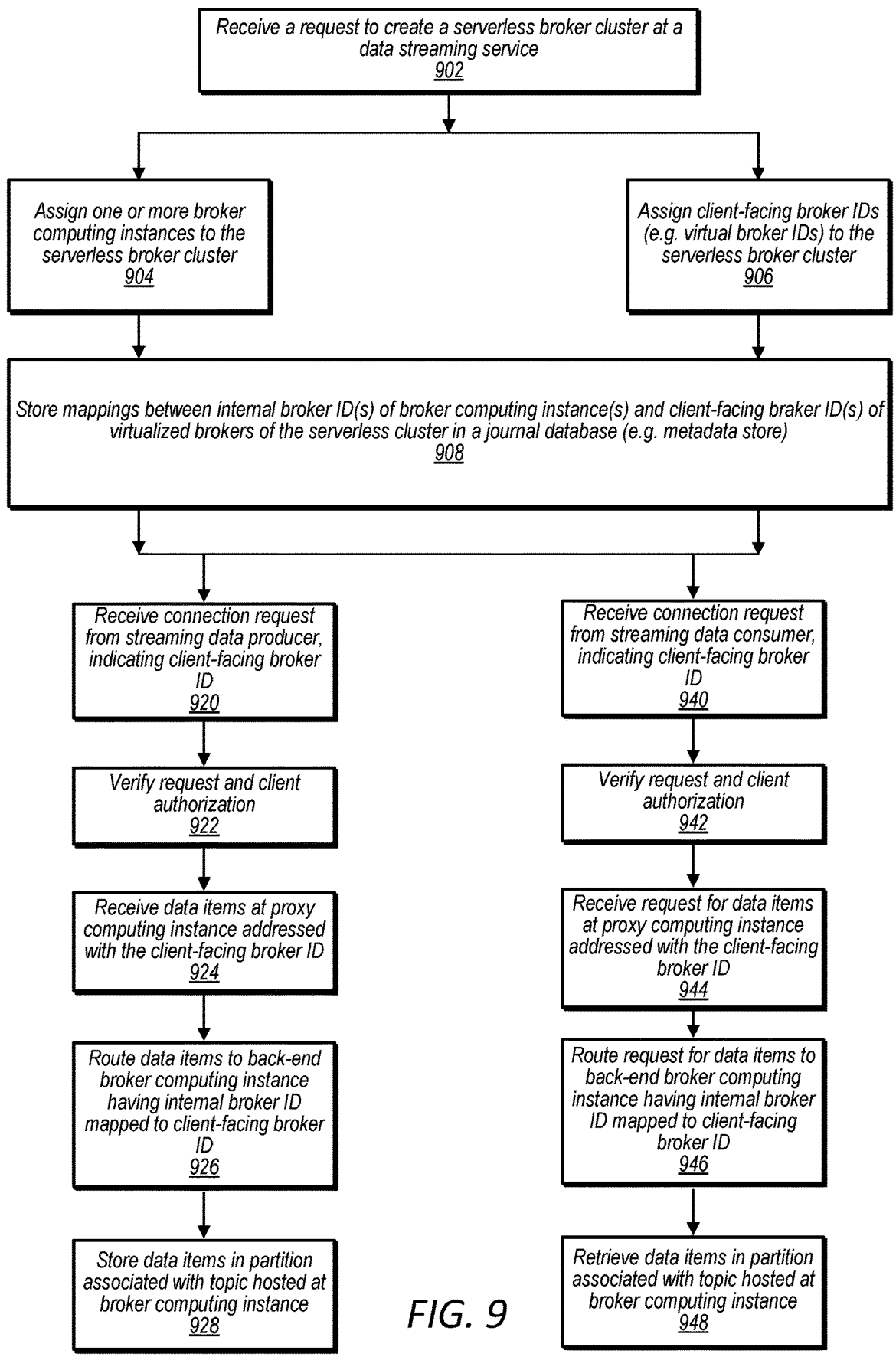
FIG. 9 is a flowchart illustrating a process of implementing and utilizing a virtualized broker cluster, according to some embodiments.

FIG. 9 is a flowchart illustrating a process of implementing and utilizing a virtualized broker cluster, according to some embodiments.

At block 902, a data streaming service receives a request to create a serverless (e.g., virtualized) broker cluster. At block 904, the data streaming service assigns one or more broker computing instances to the serverless broker cluster. At block 906, the data streaming service assigns client-facing broker IDs (e.g., virtual broker IDs) to the proxy computing instance.

At block 908, the internal broker IDs of the broker computing instances are stored in a journal database, such as may be included in metadata store 108. Also, mapping between the client-facing broker IDs and the internal broker IDs of the broker computing instance are stored in the journal database (e.g., metadata store 108).

Then, at block 920, the proxy computing instance receives a connection request from a streaming data producer, indicating client-facing broker ID. At block 922, the proxy computing instance validates the request and the authorization privileges of the streaming data producer to connect to the serverless broker cluster. In response to a positive outcome of the validation and authorization verification, at block 924, the proxy computing instance receives data items addressed with the client-facing broker ID. At block 926, the proxy computing instance routes received data items to the back-end broker compute instance having the internal broker ID mapped to the client-facing broker ID. At block 928, the back-end broker compute instance stores the data items in a partition associated with a topic hosted at the back-end broker compute instance.

In a similar manner, at block 940, the proxy computing instance receives a connection request from a streaming data consumer, indicating client-facing broker ID. At block 942, the proxy computing instance validates the request and the authorization privileges of the streaming data consumer to connect to the serverless broker cluster. In response to a positive outcome of the validation and authorization verification, at block 944, the proxy computing instance receives requests to fetch data items addressed with the client-facing broker ID. At block 946, the proxy computing instance routes received requests to fetch data items to the back-end broker compute instance having the internal broker ID mapped to the client-facing broker ID. At block 948, the back-end broker compute instance fetches the data items from a partition associated with a topic hosted at the back-end broker compute instance.

Figure 10:
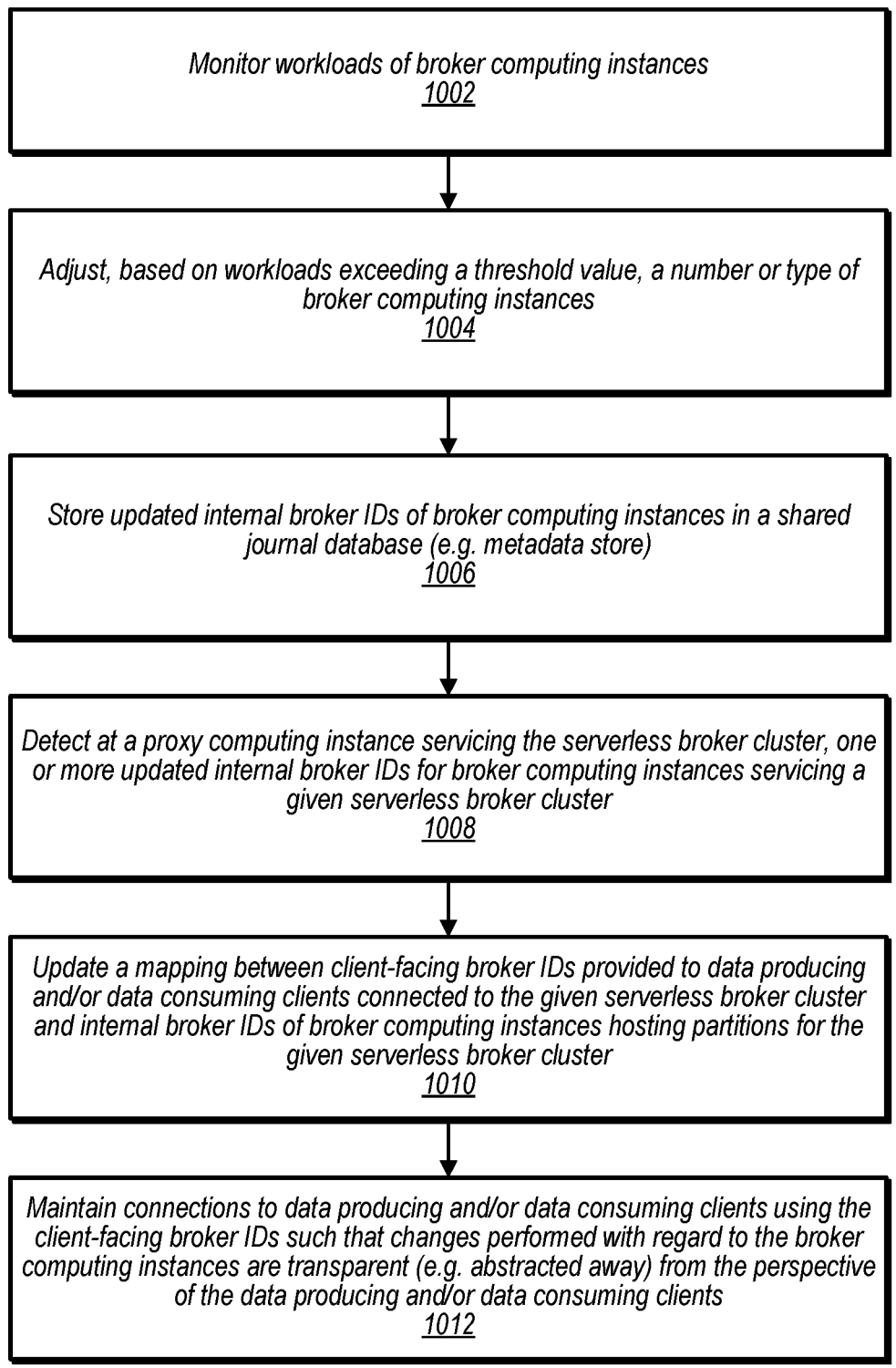
FIG. 10 is a flowchart illustrating a process of monitoring and scaling up, or scaling down, resources of a virtualized broker cluster, according to some embodiments.

FIG. 10 is a flowchart illustrating a process of monitoring and scaling up or scaling down resources of a virtualized broker cluster, according to some embodiments.

At block 1002, a resource manager monitors workloads of broker compute instances. At block 1004, the resource manager adjusts, based on the workloads exceeding a threshold value, a number or type of broker compute instances. At block 1006, updated internal broker IDs of the broker compute instances are stored in a shared journal database. Then, at block 1008, the proxy computing instances detect one or more updated internal broker IDs for broker computing instances servicing a given serverless broker cluster. Based on the detected updates, the proxy computing instances, update one or more respective one-to-one mappings between client-facing broker IDs provided to data producing and/or data consuming clients connected to the given serverless broker cluster and internal broker IDs of the broker computing instances hosting topic partitions for the given serverless broker cluster. Also, at block 1012, the proxy computing instance maintains connections to data producing and/or data consuming clients using the client-facing broker IDs such that changes performed with regard to the broker computing instances are transparent (e.g., abstracted away) from the perspective of the data producing and/or data consuming clients.

Figure 11:
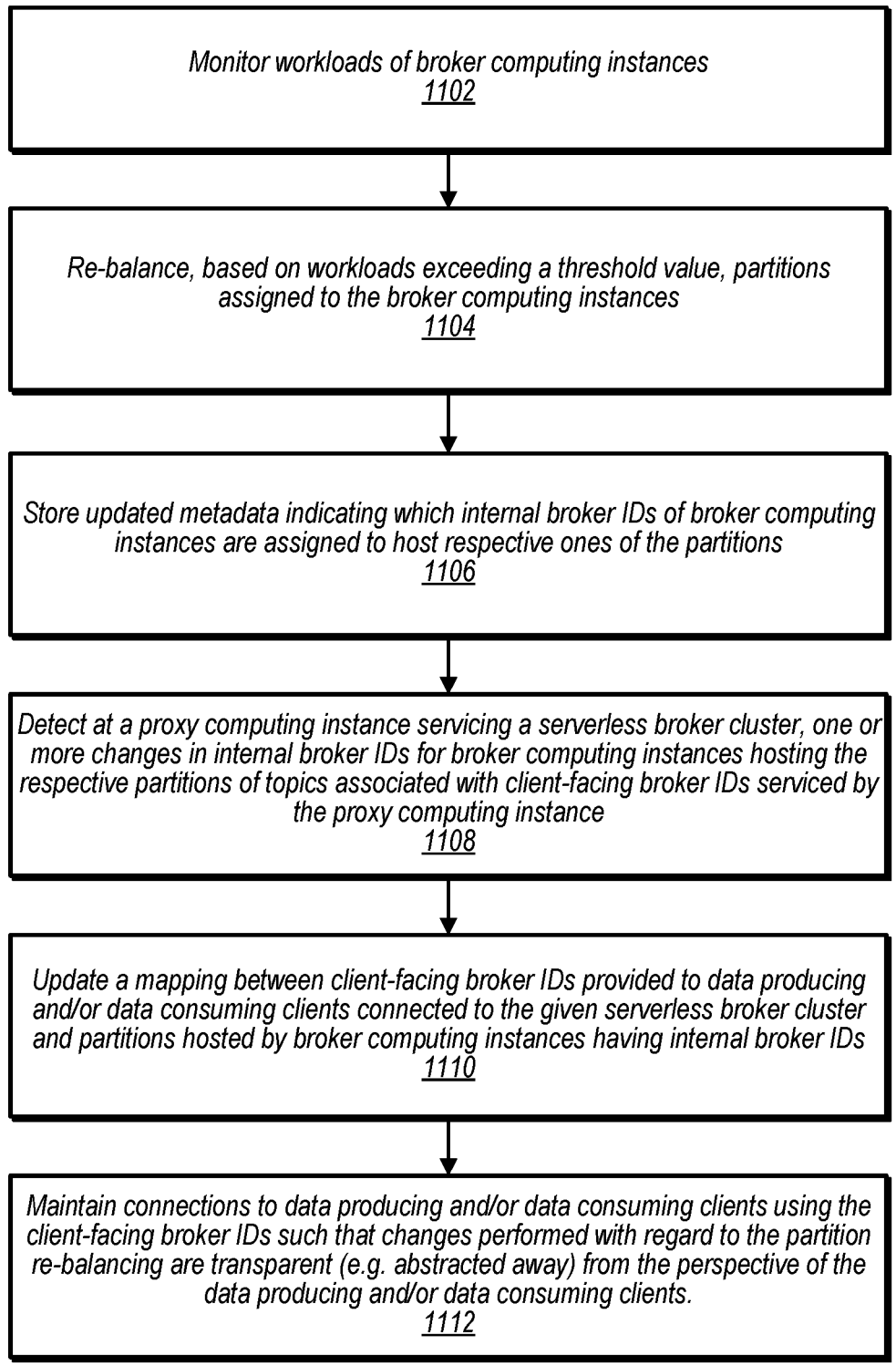
FIG. 11 is a flowchart illustrating a process of monitoring and re-balancing partitions of topics among broker computing instances of a virtualized broker cluster, according to some embodiments.

FIG. 11 is a flowchart illustrating a process of monitoring and re-balancing topics among broker computing instances of a virtualized broker cluster, according to some embodiments.

At block 1102, a resource manager monitors workloads of broker computing instances. At block 1104, the resource manager re-balances partition assignments based on the workloads of one or more of the broker computing instances exceeding a threshold value. At block 1106, updated internal broker IDs of the broker computing instances assigned to host respective ones of the partitions are stored in a shared journal database (e.g., metadata store). Then, at block 1108, the proxy computing instance assigned to the given serverless broker cluster, detects one or more updated internal broker IDs for broker computing instances servicing the respective topics. Based on the detected updates, the proxy computing instances, update one or more respective one-to-one mappings between client-facing broker IDs provided to data producing and/or data consuming clients and internal broker IDs of the broker computing instances hosting topics for one or more serverless broker clusters. Also, at block 1112, the proxy computing instances maintain connections to data producing and/or data consuming clients using the client-facing broker IDs such that changes performed with regard to the assignment of partitions to broker computing instances are transparent (e.g., abstracted away) from the perspective of the data producing and/or data consuming clients.

Figure 12:
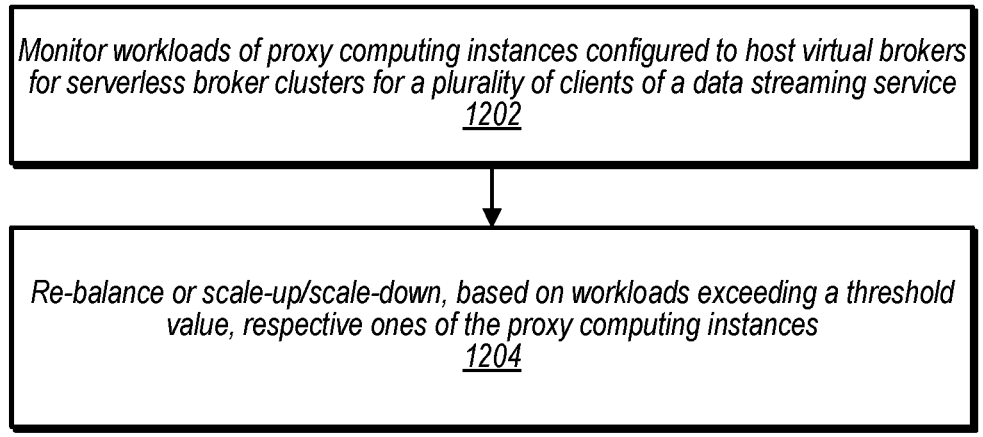
FIG. 12 is a flowchart illustrating a process of scaling up or down multi-tenant proxy computing instances for a plurality of virtualized broker clusters, according to some embodiments.

FIG. 12 is a flowchart illustrating a process of re-balancing proxy computing instances that are configured as multi-tenant proxy computing instances for a plurality of virtualized broker clusters, according to some embodiments.

At block 1202, a resource manager monitors workloads of proxy computing instances configured to host virtual brokers for serverless broker clusters for a plurality of clients of a data streaming service. At block 1204, the resource manager re-scales (up or down) the proxy computing instances based on the workloads of the proxy computing instances exceeding a threshold value.

Illustrative System

Figure 13:
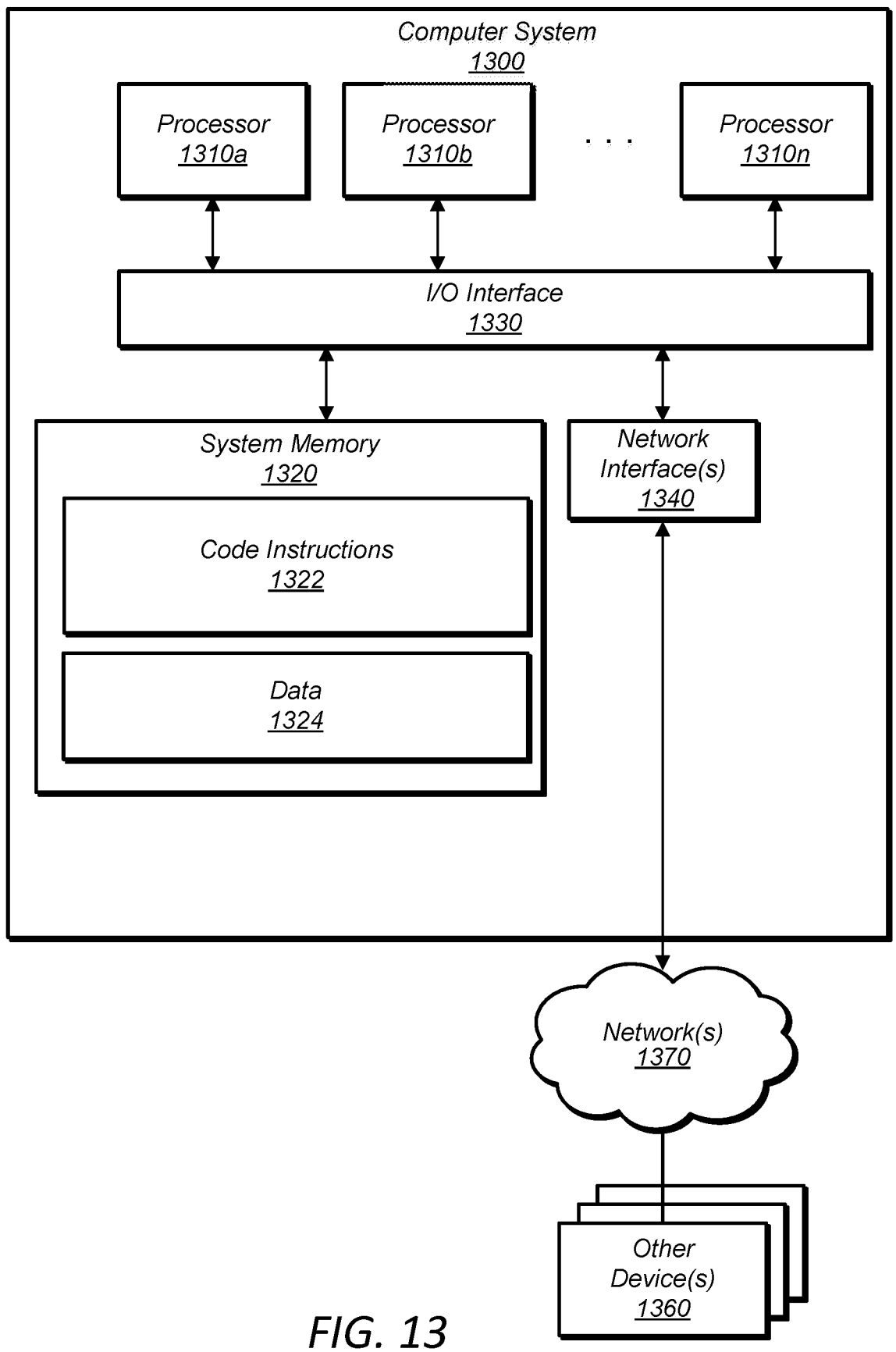
FIG. 13 is a block diagram illustrating an example computer system, according to some embodiments.

FIG. 13 is a block diagram illustrating an example computer system that may be used for implementing various components of a data streaming service as described in FIGS. 1-12, according to some embodiments. In at least some embodiments, a computer that implements a portion or all of the methods and apparatus for virtualized broker clusters, may include a general-purpose computer system or computing device that includes or is configured to access one or more computer-accessible media, such as computer system 1300 illustrated in FIG. 13. FIG. 13 is a block diagram illustrating an example computer system that may be used in some embodiments. This computer system can be used as a task manager or a task node, for example, or as a backend resource host which executes one or more of backend resource instances or one or more of the plurality of server instances (745 of FIG. 7) in a compute service. In the illustrated embodiment, computer system 1300 includes one or more processors 1310 coupled to a system memory 1320 via an input/output (I/O) interface 1330. Computer system 1300 further includes a network interface 1340 coupled to I/O interface 1330.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store instructions and data accessible by processor(s) 1310. In various embodiments, system memory 1320 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1320 as the code 1322 and data 1324.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1370, such as other computer systems or devices as illustrated in FIGS. 1-7, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above for FIGS. 1 through 12. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g., SDRAM, DDR SDRAM, RDRAM, SRAM, etc.), ROM, etc, that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Any of various computer systems may be configured to implement processes associated with the provider network, the task manager, the task nodes, the connect cluster, or any other component of the above figures. In various embodiments, the provider network, the task manager, the task nodes, the connect cluster, the client devices, the edge devices, tier devices, or any other component of any of FIGS. 1-7 may each include one or more computer systems 1300 such as that illustrated in FIG. 13. In embodiments, the provider network, the task manager, the task nodes, the connect cluster, the client devices, the edge devices, tier devices, or any other component of any of FIGS. 1-7 may include one or more components of the computer system 1300 that function in a same or similar way as described for the computer system 1300.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
receiving a request to create a broker cluster in a distributed message service;
deploying a broker instance to the distributed message service, wherein the broker instance corresponds to the broker cluster comprising a plurality of broker nodes of the distributed message service;
assigning a client facing broker instance ID to the broker instance, wherein the client facing broker instance ID is provided to one or more message producing clients and/or one or more message consuming clients;
determining, using a cluster manager of the distributed message service, respective message traffic status for topic partitions assigned to respective broker nodes of the broker cluster corresponding to the broker instance; and
rebalancing, by the cluster manager, the topic partitions assigned to the respective broker nodes based on the determined message traffic status for the topic partitions.

2. The method of claim 1, wherein:
the plurality of broker nodes are configured to broker sharing of messages for one or more topics between the one or more message producing clients and one or more message consuming clients of the distributed message service; and
the broker instance is configured to function as a client facing proxy situated between the message producing clients and/or the message consuming clients, and the plurality of broker nodes.

3. The method of claim 1, further comprising:
routing, by the broker instance, requests and responses to, and from, the one or more message producing clients and/or the one or more message consuming clients using the client facing broker instance ID, wherein the plurality of broker nodes have internal broker IDs internal to the distributed message service, and wherein the internal broker IDs of the broker nodes are abstracted from the one or more message producing clients and/or the one or more message consuming clients.

4. The method of claim 1, further comprising:
receiving, at the broker instance, a message request from the one or more message producing clients and/or the one or more message consuming clients, wherein the request is signed with credentials of the message producing client or the message consuming client;
determining, based on the credentials, that the message producing client or the message consuming client is authenticated and authorized to connect using the client facing broker instance ID; and
determining, at a given broker node having an internal broker ID mapped to the client facing broker instance ID, that the message producing client or the message consuming client is authorized to access a topic hosted on the given broker node.

5. The method of claim 1, further comprising:
maintaining, by a metadata store accessible by the broker instance, a one-to-one mapping between the client facing broker instance ID provided to a given message producing client or a given message consuming client and a given internal broker ID for a broker node assigned to store, or fetch, streaming messages for a given topic to which the given message producing client provides streaming messages or from which the given message consuming client consumes streaming messages.

6. The method of claim 1, further comprising:
monitoring, by the cluster manager, respective workloads of the plurality of broker nodes; and
adjusting, by the cluster manager, a resource capacity of the plurality of broker nodes based, at least in part, on the monitored respective workloads of the plurality of broker nodes.

7. The method of claim 6, further comprising:
updating, at a metadata store, based on the adjustment of the resource capacity of the plurality of broker nodes, a set of internal broker IDs of the plurality of broker nodes to include more, fewer, or different internal broker IDs; and
updating, by the broker instance, based on the updated metadata store, mapping of the assigned client facing broker instance ID to respective ones of the set of internal broker IDs that have changed as a result of the adjustment of the resource capacity of the plurality of broker nodes, wherein the mapping changes are transparent to the one or more message producing clients and/or the one or more message consuming clients.

8. The method of claim 1, further comprising:
updating, by a metadata service, one or more mappings such that one or more topics that have been re-balanced to a different broker node with a different internal broker ID remain associated with the same client facing broker instance ID.

9. The method of claim 1, wherein the distributed message service conforms to a Kafka protocol for streaming messages between the one or more message producing clients and/or the one or more message consuming clients.

10. A system, comprising:
a plurality of computing devices, comprising at least one processor and at least one memory, configured to implement a distributed message service wherein the distributed message service is configured to:
receive a request to create a broker cluster in the distributed message service;
deploy a broker instance to the distributed message service, wherein the broker instance corresponds to the broker cluster comprising a plurality of broker nodes of the distributed message service;
assign a client facing broker instance ID to the broker instance, wherein the client facing broker instance ID is provided to one or more message producing clients and/or one or more message consuming clients;
determine, using a cluster manager of the distributed message service, respective message traffic status for topic partitions assigned to respective broker nodes of the broker cluster corresponding to the broker instance; and
rebalance, by the cluster manager, the topic partitions assigned to the respective broker nodes based on the determined message traffic status for the topic partitions.

11. The system of claim 10, wherein the:
the plurality of broker nodes are configured to broker sharing of messages for one or more topics between the one or more message producing clients and one or more message consuming clients of the distributed message service; and
the broker instance is configured to function as a client facing proxy situated between the message producing clients and/or the message consuming clients, and the plurality of broker nodes.

12. The system of claim 10, wherein the distributed message service is configured to:
route, by the broker instance, requests and responses to, and from, the one or more message producing clients and/or the one or more message consuming clients using the client facing broker instance ID, wherein the plurality of broker nodes have internal broker IDs internal to the distributed message service, and wherein the internal broker IDs of the broker nodes are abstracted from the one or more message producing clients and/or the one or more message consuming clients.

13. The system of claim 10, wherein a plurality of broker instances, including the broker instance, is configured to serve as proxies for a plurality of broker clusters for a plurality of message producing clients and/or message consuming clients.

14. The system of claim 13, wherein the distributed message service is configured to:
scale-up or scale down a number of broker instances implemented to service the plurality of broker clusters for the plurality of message producing and/or message consuming clients.

15. One or more non-transitory, computer-readable, storage media storing program instructions that, when executed on or across one or more computing devices, cause the one or more computing devices to:
receive a request to create a broker cluster in a distributed message service;
deploy a broker instance to the distributed message service, wherein the broker instance corresponds to the broker cluster comprising a plurality of broker nodes of the distributed message service;
assign a client facing broker instance ID to the broker instance, wherein the client facing broker instance ID is provided to one or more message producing clients and/or one or more message consuming clients;
determine, using a cluster manager of the distributed message service, respective message traffic status for topic partitions assigned to respective broker nodes of the broker cluster corresponding to the broker instance; and
rebalance, by the cluster manager, the topic partitions assigned to the respective broker nodes based on the determined message traffic status for the topic partitions.

16. The one or more non-transitory, computer-readable, storage media of claim 15, wherein:
the plurality of broker nodes are configured to broker sharing of messages for one or more topics between the one or more message producing clients and one or more message consuming clients of the distributed message service; and
the broker instance is configured to function as a client facing proxy situated between the message producing clients and/or the message consuming clients, and the plurality of broker nodes.

17. The one or more non-transitory, computer-readable, storage media of claim 15, wherein the program instructions, when executed on or across the one or more computing devices, cause the one or more computing devices to:
route, by the broker instance, requests and responses to, and from, the one or more message producing clients and/or the one or more message consuming clients using the client facing broker instance ID, wherein the plurality of broker nodes have internal broker IDs internal to the distributed message service, and wherein the internal broker IDs of the broker nodes are abstracted from the one or more message producing clients and/or the one or more message consuming clients.

18. The one or more non-transitory, computer-readable, storage media of claim 17, wherein the program instructions, when executed on or across the one or more computing devices, cause the one or more computing devices to:
enforce throttling limits for incoming requests from the one or more message producing clients and/or the one or more message consuming clients directed at the internal broker IDs of the broker nodes.

19. The one or more non-transitory, computer-readable, storage media of claim 15, wherein the program instructions, when executed on or across the one or more computing devices, cause the one or more computing devices to:
monitor, by the cluster manager, respective workloads of the plurality of broker nodes; and
adjust, by the cluster manager, resource capacity of the plurality of broker nodes based, at least in part, on the monitored respective workloads of the plurality of broker nodes.

20. The one or more non-transitory, computer-readable, storage media of claim 15, wherein the program instructions, when executed on or across the one or more computing devices, cause the one or more computing devices to:
maintain, by a metadata store accessible by the broker instance, a one-to-one mapping between the client facing broker instance ID provided to a given message producing client or a given message consuming client and a given internal broker ID for a broker node assigned to store, or fetch, streaming messages for a given topic to which the given message producing client provides streaming messages or from which the given message consuming client consumes streaming messages.

* * * * *